United States Patent [19]

Gibson et al.

[11] E Re. 29,800

[45] Reissued Oct. 17, 1978

[54] METHOD OF TREATING YARNS TO PROVIDE KINKING AND/OR MOTTLED EFFECTS ON FABRICS

[75] Inventors: Kirkland H. Gibson, North Kingstown; Henry E. Protzmann, East Greenwich, both of R.I.

[73] Assignee: H. G. P. Corp., Johnston, R.I.

[21] Appl. No.: 787,745

[22] Filed: Apr. 15, 1977

Related U.S. Patent Documents

Reissue of:

[64] Patent No.: 3,605,225
Issued: Sep. 20, 1971
Appl. No.: 853,042
Filed: Aug. 26, 1969

[51] Int. Cl.[2] ..... D02G 1/00
[52] U.S. Cl. ..... 28/218
[58] Field of Search ..... 28/218; 139/383 R

[56] References Cited

U.S. PATENT DOCUMENTS

| | | | |
|---|---|---|---|
| 1,008,613 | 11/1911 | Palmer | 28/218 X |
| 1,141,665 | 6/1915 | Stewart | 139/383 R |
| 1,554,532 | 9/1925 | Stead | 28/218 X |
| 2,584,891 | 2/1952 | Libby | 139/383 R |
| 3,012,303 | 12/1961 | Whitaker et al. | 28/218 X |
| 3,064,689 | 11/1962 | Piazzolla et al. | 139/432 |
| 3,102,322 | 9/1963 | Whitaker | 28/218 |
| 3,456,431 | 7/1969 | Fleissner | 28/218 X |
| 3,536,019 | 10/1970 | Honda et al. | 28/218 X |
| 4,006,758 | 2/1977 | Libby | 139/383 R X |

FOREIGN PATENT DOCUMENTS

| | | | |
|---|---|---|---|
| 838,195 | 5/1952 | Fed. Rep. of Germany. | |
| 3,020 of | 1853 | United Kingdom | 28/218 |
| 652,552 | 4/1951 | United Kingdom | 139/383 R |

OTHER PUBLICATIONS

Peirce, F. T.; Geometrical Principles Applicable to the Design of Functional Fabrics, Textile Research Journal, 17(2): pp. 123–147, Mar. 1947.

*Primary Examiner*—Robert R. Mackey
*Attorney, Agent, or Firm*—Barlow & Barlow

[57] ABSTRACT

The placing of a plurality of yarns into a woven fabric form of a type where the filling yarn may be easily unwoven so as to treat the warp yarns either by means of a color, bulking, or setting into a kinked effect or all of them and then unweaving the woven fabric to provide a plurality of similarly treated yarns for reworking into various forms such as fabrics.

5 Claims, 8 Drawing Figures

METHOD OF TREATING YARNS TO PROVIDE KINKING AND/OR MOTTLED EFFECTS IN FABRICS

Matter enclosed in heavy brackets [ ] appears in the original patent but forms no part of this reissue specification; matter printed in italics indicates the additions made by reissue.

BACKGROUND OF THE INVENTION

So-called prefabrics have been knitted by the manipulation of a single yarn into knitted form, variously colored, and then unraveled to provide a single yarn with intermittent coloring or splotches as shown in U.S. Pat. No. 3,012,303 dated Dec. 12, 1961. This process does not provide a precise control; also it provides but a single end and kinking thereof is uncertain.

SUMMARY OF THE INVENTION

This invention utilizes the weaving of a plurality of warp yarns into a fabric by the insertion of a filling yarn in the warp yarns in such a relation that the filling may be easily unraveled or unwoven and further the yarns may be loosely woven or the filling yarn may be varied as to the picks per inch or its diametrical size depending upon the amount of kink which is desired in the warp yarns. The fabric so formed may be heat treated to bulk it or to set it to provide the desired kinking of the warp yarns and may be colored either by a solid color or by stripes or splotches after which unraveling takes place to remove the filling from the warp and provide a plurality of yarns for reworking into various forms such as a fabric where bulking, kinking or mottled colors or all of them are desired.

DESCRIPTION OF THE PREFERRED EMBODIMENT

With reference to the drawings, 10 designates generally a supply of warp yarns from various warp beams. 11 designates the station of weaving these warp yarns by inserting a filling therein in a particular relation to be described so as to provide a fabric 12 which issues from this weaving station. 13 designates the coloring station wherein a dye is applied to the fabric 12 as it passes therethrough. The fabric now designated 12′ is then passed into a setting station 14 where heat or heat and pressure is applied to relax or bulk or to set the coloring and also set the undulating or kink relation of the warp threads formed by their weaving relation with the filling threads. The fabric now at 12″ is moved into a station 15 where the filling thread is removed and then the warp yarns are packaged as at 16 for further reworking as desired.

Figure 1:
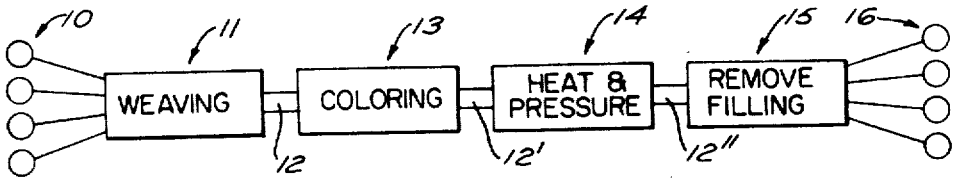
FIG. 1 is a diagrammatic view illustrating the various steps which are performed upon the yarns which are the subject of this invention.
Figure 2:
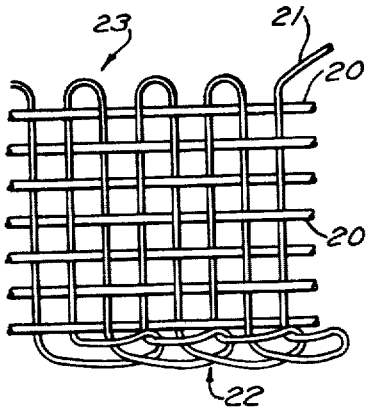
FIG. 2 is a detail plan on a greatly enlarged scale illlustrating the weaving relation of the filling and warp yarns so that the filling yarn may be easily withdrawn by pulling upon it to remove it from the warp yarns.

At the weaving station 11, the plurality of warp yarns 20 ([diagrammatic showing] *diagrammatically shown in* FIG. 2 in a greatly reduced number of warp ends) are shown in the greatly enlarged relation in FIG. 2 where they are separated sufficiently so that the relationship of the filling yarn 21 may be observed. The insertion of the filling yarns is such that a knitted relationship at 22 on one edge is provided, while the usual selvage on the other side of the fabric 23 is formed. This is done by the use of a latch needle such as is performed by the Bonas needle loom and illustrated in Section 2 of their 1967 catalog. One woven selvage on one side of the entry of the weft insertion needle is produced, while the opposite selvage is locked by a knitting action. This knitting action is accomplished by a so-called inclined latch needle method or a flat needle method. By the inclined latch needle, the knitted selvage is produced by knitting the weft yarn in such a way that the extremity of one weft loop is drawn through the previously formed loop in a crochet fashion by the latch needle. This is mounted hook uppermost at an angle of 35° to the vertical away from the fabric. This is the form which is illustrated in FIG. 2 of this application.

Figure 3:
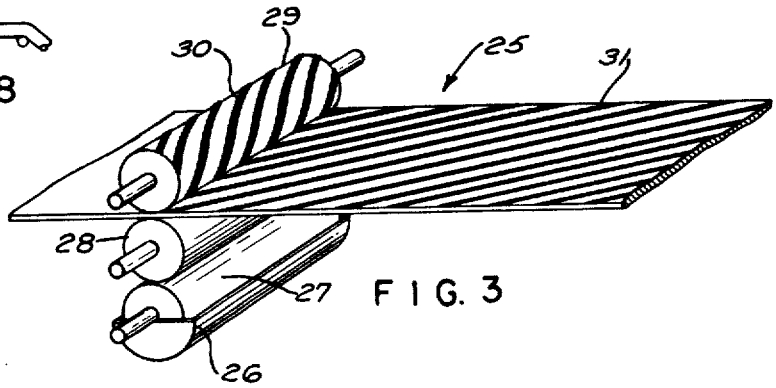
FIG. 3 is a perspective view illustrating the intermittent coloring of the fabric formed.

After the insertion of the filling threads 21, the fabric now designated 25 (FIG. 3) is passed through one or a plurality of printing or padding stations, one of which is shown. Each may apply its own color to the fabric. A part of a Vigoureux printer is illustrated in FIG. 3 which includes a dye trough 26, a first lower partly immersed dye pick-up roller 27, a second upper pick-up and application roller 28, and a printing roller 29, the latter being on the upper side of the fabric 25. The lower roller 27 picks up dye from the trough 26, transferring it to the upper pick-up roller 28. The printing roller 29 has a plurality of raised portions 30 thereon, and as these press the fabric into engagement with the roller 28, the dye will be applied at the locations where this pressure of the raised portion 30 occurs, thus forming a plurality of stripes 31, in the showing here, diagonally on the fabric 25 as it passes [thru] *through* this printer or padder. At other stations similar to this, different colors may be applied.

After this coloring, when the warp threads are in a wavy form, it is passed into a station 14 where heat and pressure are applied. This will drive the dye into the fabric and particularly the warp threads thereof, while at the same time if the fabric is loosely woven it will permit relaxation of the yarns causing them to increase in diameter or bulk. Also the heat will set the warp threads in their kinked form, particularly if they are of a synthetic fiber.

Figure 4:
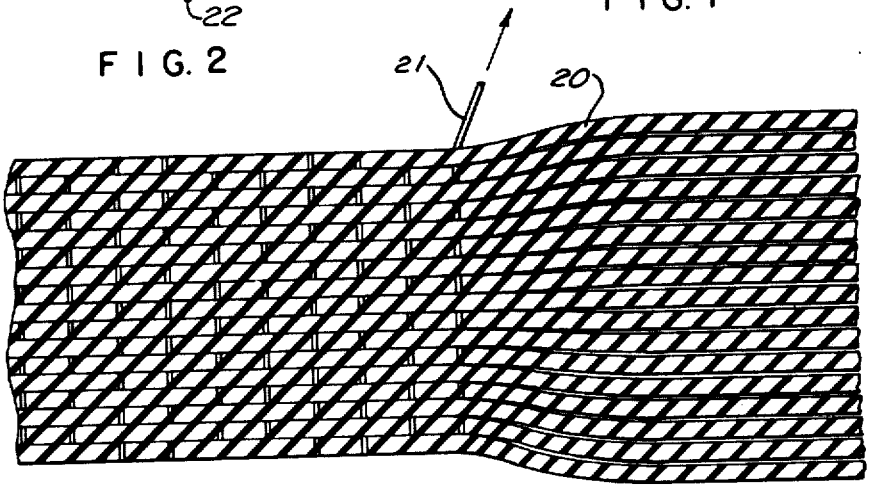
FIG. 4 is a top plan view on an enlarged scale showing the removing of the filling yarn and the warp yarns in separated relation.

The next station 15 is where the *flow of the fabric is reversed and the* filling thread 21 is removed from the warp threads 20 as shown at FIG. 4, and this may be done by unraveling the filling thread 21 from the warp threads by pulling upon it with any suitable means and a take-up, thus leaving the warp threads 20 in a separated relation colored and kinked. *As seen in FIG. 4, the filling is spaced a greater distance apart than the warp threads 20.*

Figure 5:
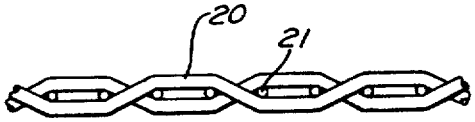
FIG. 5 is a sectional view taken warpwise of the fabric in a modified form from that shown in FIG. 2.
Figure 6:
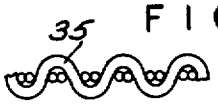
FIGS. 6, 7 and 8 illustrate the warp yarns of the above mentioned fabric with various degrees of kink therein.
Figure 7:
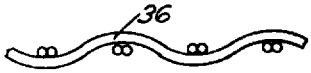
Figure 8:
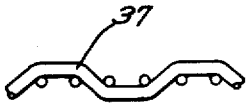

Depending upon the tightness of the weave, the undulations will be varied. As seen in FIG. 6, a rather tight kinking relation 35 is provided, whereas in FIG. 7 as shown at 36, the wavy relation is less pronounced, while in FIGS. 5 and 8, a still different form 37 may be provided by floating the warp 20 over a plurality of filling picks 21. This kinking is all dependent upon the tightness of the weave and the character of the weave, whether it be 1 and 1 or the warp threads are floated over a number of filling threads, etc. Further variation may be had by varying the diameter of the filling yarn *up to the size of the warp.*

By weaving, bulking of the yarns may be had and a very close control may be had both of the application of the color to the warp threads and also a very close control of the type of undulations or kinking may be had. Further, a plurality of yarns are provided which from the process employed may be of endless length depending upon the warp supply. Further, there is really no theoretical limit to the number of warp threads which may be operated upon at the same time. Practically the only limit is the width of the machine which weaves the filling thread into the warp threads. The process is far more precise than may be had by a knitting relation such as disclosed in the above "Background of the Invention."

We claim:

1. The method of simultaneously treating a plurality of yarns which comprises providing a plurality of relatively large warp yarns, weaving in a selected fabric construction said warp yarns with [a] *one single continuous* filling yarn of a relatively smaller diameter than said warp yarns and disposed with relation to said warp yarns *a greater distance apart than the warp yarns and* in *knit-like loops along one edge, each filling yarn loop knitted to the preceding loop to provide* a continuous unweavable relation[,] *from one end only,* coloring said fabric *while in said unweavable relation* to color the warp yarns, the weave selection providing the character of the kink imparted to the warp yars, *moving said fabric to another station* and [unweaving] *continuously pulling on said filling yarn to unweave* said filling yarn *and then packaging the separated warp yarns* to provide a plurality of colored *warp* yarns of controlled kink character ranging from no *perceptible* kink to high kink amplitude for reworking into various forms.

2. The method of claim 1 wherein said coloring is intermittent to provide mottled yarns.

[3. The method of claim 1 wherein said colored yarns are intermeshed into fabric form.]

4. The method of claim 1 wherein after coloring and prior to removal of the filling yarn, the fabric is heat set to maintain a kink in the warp yarns provided by the insertion of the filling yarn.

5. The method of claim 4 wherein said colored yarns are intermeshed into fabric form.

6. The method of simultaneously treating a plurality of yarns which comprises providing a plurality of relatively large warp yarns, weaving in a selected fabric construction said warp yarns with a *continuous* filling yarn of a relatively smaller diameter than the warp yarns and disposed with relation to said warp yarns *a greater distance apart than the warp yarns and* in *knit-like loops along one edge, each filling yarn loop knitted to the preceding loop to provide* a continuous unweavable relation *from one end only* and heat treating said fabric to allow it to bulk the warp yarns, the weave selection providing the character of the kink imparted to the warp yarn, [and unweaving] *moving the fabric to another station and continuously pulling on said filling yarn to unweave* said filling yarn *and then packaging the separated warp yarns* to provide a plurality of *warp* yarns of controlled kink character ranging from no *perceptible* kink to high kink amplitude for reworking into various forms.

* * * * *